Patented June 6, 1933

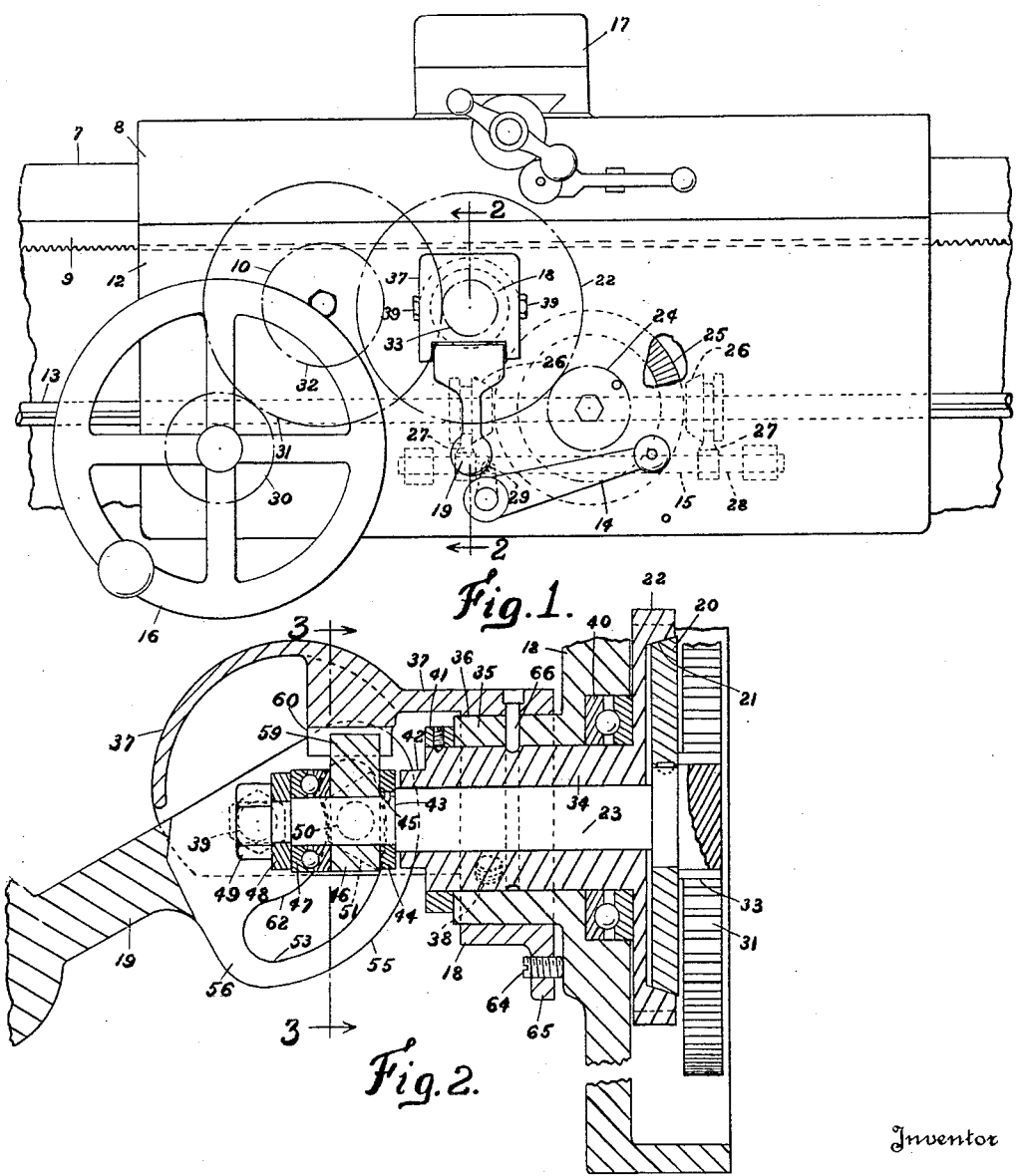

1,912,409

UNITED STATES PATENT OFFICE

WILLIAM SCHRODER, OF COVINGTON, KENTUCKY, ASSIGNOR TO THE SEBASTIAN LATHE COMPANY, OF COVINGTON, KENTUCKY, A CORPORATION OF OHIO

CARRIAGE CONTROL

Application filed May 18, 1931. Serial No. 538,163.

This invention relates to a simplified and extremely durable friction control means for carriages of lathes and other shaping machinery.

An object of the invention is to provide a novel type of means for controlling transmission of power for movement of a carriage, the controlling means being constructed in such manner as to practically eliminate wear and parts replacement.

A further object is the elimination of the usual springs in devices of the above character, whereby there is secured a more positive and effective engagement and release of the power transmission elements thereof.

Another object of the invention is to provide a simple adjusting means for the power control device.

These and other objects are attained by the means described herein and disclosed in the accompanying drawings, in which:

Fig. 1 is a fragmental front elevational view of a lathe or like carriage the apron of which has embodied therein the device of the invention.

Fig. 2 is a fragmental cross-sectional view taken on line 2—2 of Fig. 1.

Figure 3:
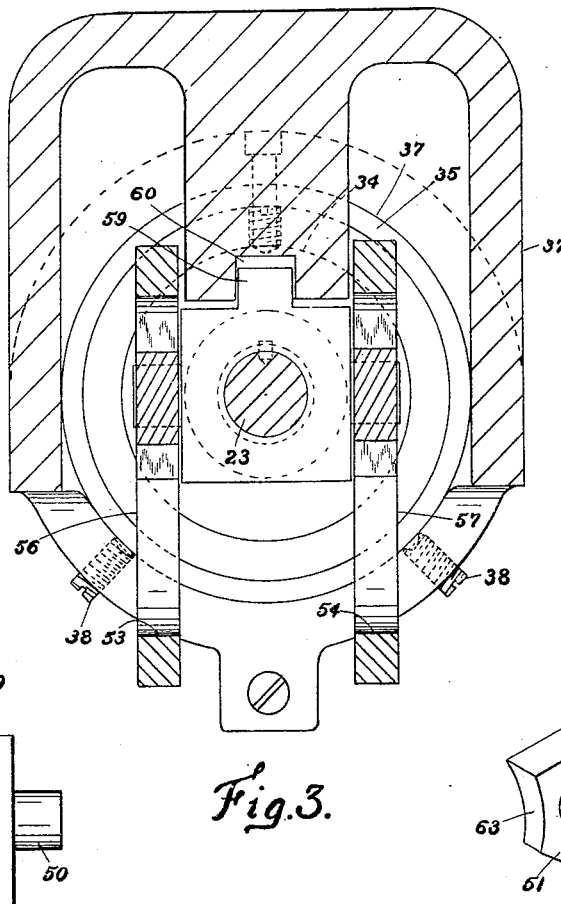
Fig. 3 is a cross-sectional view taken on line 3—3 of Fig. 2.

It is customary, especially in the construction of lathe carriages, to provide the apron thereof with control means whereby the carriage may be either manually or power traversed along the bed or rail of the machine, the power operated traversing means being released or rendered inoperative when the carriage is to be manually moved. The control means, usually in the form of a friction clutch, heretofore have been the source of considerable trouble because of the tendency to wear rapidly and to slip when the machine was under load this being true especially of those devices employing springs in the clutch mechanism thereof. By means of the present invention the springs are eliminated and the control means is simplified and rendered much more durable and reliable in its operation, with a substantial reduction in manufacturing cost.

In the drawings, 7 indicates a rail along which the carriage 8 is adapted to be reciprocated longitudinally. Disposed longitudinally of the rail is a toothed rack 9 which meshes with a manually and power rotatable pinion 10 supported by the apron 12 of the carriage or by the carriage itself. A power shaft 13 which is rotated by a suitable electric motor or other power source, not shown, supplies the power for driving the pinion 10. A forward and reverse means 15 for changing the direction of rotation of the pinion is provided, and same is controlled by the lever 14. Hand traverse of the carriage is by means of the handwheel 16, and at 17 is indicated a suitable tool support.

Indicated generally by the character 18 is a friction control means whereby rotation of the power shaft is selectively imparted to the carriage traversing pinion 10, upon actuation of the handle 19. By raising the handle as illustrated in Fig. 2, the truncated cone shaped disc 20 is caused to frictionally engage the correspondingly tapered circular recess 21 in the clutch driving gear 22. Instead of the tapered or cone type of friction surfaces, disc type friction elements may be provided, if desired. One of the friction elements, such as 20, is keyed or otherwise fixed upon the central or main shaft 23 which shaft is not only rotatable but capable of limited reciprocatory movement by a means about to be described and which is controlled by the handle 19. It should readily be understood that rotational movement is continuously imparted to the clutch driving gear 22 by the gear 24 which is fixed relative to a bevel gear 25 that may have its rotation reversed by selectively placing in engagement therewith one or the other of the bevel pinions 26. Each bevel pinion is splined onto the power shaft 13 and shiftable by means of suitable gear shifters 27 mounted on a rod 28 adapted to be reciprocated upon actuation of the reverse lever 14. The reverse lever may be pivotally connected with the rod 28 as indicated at 29, or it may be otherwise cooperatively associated therewith for reciprocation of the pinions. The clutch shaft 23 may be rotated by means of the handwheel 16 through the train of intermeshing gears 30, 31, 32 and 33, the latter being fixed on said shaft or integral therewith.

The clutch shaft 23 is supported for rotation in the bore of the axial extending hub 34 which is integral with or otherwise fixed relative the combined gear and clutch member 22, and said hub is in turn rotatably supported in a bored boss 35 which is integral with the apron 12. The bored boss has a finished outer surface 36 upon which may be fixed the housing or handle supporting member 37, by means of screws or the like 38. The handle 19 is mounted on the support 37 for rocking or pivotal movement by means of opposed aligned stud bolts 39 which pass through the support and into the material of the handle. Longitudinal shifting of the hub 34 is precluded in one direction by the antifriction bearing 40 which abuts the apron and the clutch element 22, and in the opposite direction by the collar 41 which is fixed upon the opposite end of the hub.

Adjacent the end 42 of the hub, the shaft 23 is provided with a shoulder 43 which provides an abutment for a circular shaft-encircling washer 44 which is keyed or pinned to the shaft as at 45 to preclude rotation relative thereto. Abutting the opposite face of the washer is the bored friction block support or yoke 46 which encircles the shaft 23 and relative to which said shaft may rotate. The yoke is held in position on the shaft by means of the thrust bearing 47, the washer 48, and the nut 49 which is threaded onto the shaft end.

Figure 5:
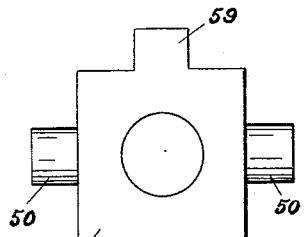
Fig. 5 is a plan view showing in detail a friction block support.
Figure 4:
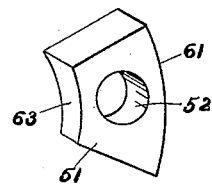
Fig. 4 is an isometric view of a self-positioning segmental friction block forming a detail of the invention.

The block support or yoke 46 (see Fig. 5) is provided on opposite sides thereof with aligned extending studs or trunnions 50 each of which is adapted to support a segmental friction block 51, shown in detail in Fig. 4. The friction blocks, of which there are two, have transverse bores 52 into which slidably fit the trunnions or studs 50, so that the blocks may pivot thereon. The blocks are adapted for reception in elongated arcuate slots 53 and 54 provided in the bifurcated head end 55 of the handle. It is readily evident by reference to Figs. 2 and 3, that the head end of the handle, being bifurcated, provides the spaced parallel arms or walls 56 and 57 in which are located the said arcuate slots 53 and 54, respectively. Each slot is adapted to function as a cam or eccentric, the upper end thereof being slightly closer to the pivot 39 than the lower end. The blocks 51, therefore, being slidingly received in the slots, thereby are moved toward or from the pivot 39 as the handle 19 is actuated, and the yoke or block support 46 thereupon also is moved, in a direction axially of shaft 23. As is clear from the disclosure of Fig. 2, the shaft is compelled to move with the block support wherefore the reciprocable clutch element 20 is selectively engaged and disengaged relative the clutch element 22.

To maintain the yoke or block support in proper position relative to the slotted arms of the handle, the yoke preferably is provided with a suitable guide 59 cooperatively associated with a guide or way 60 formed interiorly of, and integrally with, the housing 37. By this means, the block support may be very accurately guided in its reciprocatory movement and precluded from rotating even slightly with the shaft 23.

It should be noted that the segmental blocks 51 present large friction surfaces 61 which will not readily wear the elongated slots 53 and 54 in which they ride, and that said large surfaces insure such frictional binding as will serve to effectively maintain the handle 19 in adjusted positions. By reason of the arcuate slot and friction block arrangement, disengagement of the clutch elements 20 and 21 is rendered as positive as the engagement thereof since the inner wall 62 of each slot provides an abutment for the concave faces 63 of the friction blocks.

In the event that a change in the angularity of inclination of the handle 19 is desired, it is necessary only to loosen the housing retaining screws 38 and to shift the housing forward or back on the boss 35, by means of the adjustment screw 64 which engages a threaded bore in the depending ear 65 formed on the housing. This adjustment serves to alter the normal spacing between the clutch elements 20 and 21 and may be used to take up for wear in the clutch elements, if necessary.

The character 66 indicates a lubrication duct whereby the rotating hub 34 may be supplied with grease or oil.

It is to be understood that various modifications and changes in structural details of the device may be made, within the scope of the appended claims, without departing from the spirit of the invention.

What is claimed is:

1. In combination a support, a clutch element having an extending bored hub rotatably mounted upon the support, a clutch shaft reciprocably and rotatably mounted in the bore of the hub and extending beyond the hub, a clutch element on the shaft for cooperatively engaging the first mentioned clutch element, a movable control handle pivotally mounted on the support and comprising a head with spaced elongated cam faces eccentric to the pivotal mounting of the handle, a friction block support rotatably mounted on the clutch shaft, and a segmental friction block rockingly mounted on the block support and engaging the cam faces of the handle.

2. In combination a support, a clutch element having an extending bored hub rotatably mounted upon the support, a clutch shaft reciprocably and rotatably mounted in the bore of the hub and extending beyond the hub, a clutch element on the shaft for cooperatively engaging the first mentioned clutch element, a movable control handle pivotally mounted on the support and comprising a head with spaced elongated cam faces eccentric to the pivotal mounting of the handle, a friction block support rotatably mounted on the clutch shaft, a segmental friction block rockingly mounted on the block support and engaging the cam faces of the handle and means for adjustably shifting the control handle pivot lengthwise of the shaft.

3. In combination a support, a clutch element having an extending bored hub rotatably mounted upon the support, a clutch shaft reciprocably and rotatably mounted in the bore of the hub and extending beyond the hub, a clutch element on the shaft for cooperatively engaging the first mentioned clutch element, a movable control handle pivotally mounted on the support and comprising a head with spaced elongated cam faces eccentric to the pivotal mounting of the handle, a friction block support rotatably mounted on the clutch shaft, a segmental friction block rockingly mounted on the block support and engaging the cam faces of the handle and cooperative guide means on the friction block support and the handle support for precluding rotation of the friction block support with the shaft.

4. In combination a support including a bored boss, a clutch-element having an extending bored hub rotatably mounted in the bored boss of the support, a clutch shaft reciprocably and rotatably mounted in the bore of the hub and extending beyond the hub, a clutch element on the shaft for cooperatively engaging the first mentioned clutch element, a control handle, means cooperating with the control handle for reciprocation of the shaft, and a housing mounted for adjustment along the bored boss and providing a support for the control handle.

5. In combination a support including a bored boss, a clutch-element having an extending bored hub rotatably mounted in the bored boss of the support, a clutch shaft reciprocably and rotatably mounted in the bore of the hub and extending beyond the hub, a clutch element on the shaft for cooperatively engaging the first mentioned clutch element, a control handle, means including a longitudinally movable support block cooperating with the control handle for reciprocation of the shaft, a housing mounted for adjustment along the bored boss and providing a support for the control handle, and cooperative guide means on the support block and housing for guiding the support block in its longitudinal movement.

6. In combination with a machine tool carriage, a power operated clutch element having a friction surface, a second clutch element having a friction surface the clutch elements being movable relatively for engagement with one another with varying degrees of firmness, a clutch shaft associated with one of the clutch elements, a pivoted movable control handle having a weighted end and an opposite end comprising a head provided with spaced elongated cam faces eccentric to the pivot of the handle, a friction block support rotatably mounted on the clutch shaft, a segmental friction block rockingly mounted on the block support and engaging the cam faces of the handle, the pivot for the control handle serving to support the control handle with its weighted end tending always to return the clutch elements to the disengaged relationship, in opposition to the holding action of the friction block.

7. In combination with a machine tool carriage, a power operated clutch element having a friction surface, a second clutch element having a friction surface the clutch elements being movable relatively for engagement with one another with varying degrees of firmness, a pivoted weighted operating handle having operative connection with one of the clutch elements, a longitudinally reciprocable clutch shaft associated with one of the clutch elements, means for holding the clutch elements engaged with a degree of firmness required in accordance with the character of work operated upon by the machine said holding means comprising a head on the handle provided with spaced elongated cam faces eccentric to the pivot of the handle, a friction block support rotatably mounted on the clutch shaft and a segmental friction block rockingly mounted upon the block support and engaging the cam faces of the handle, and a pivot means on the carriage which supports the operating handle with its weighted portion tending always to gravitate for returning the clutch elements to the disengaged relationship, in opposition to the action of the holding means.

In testimony whereof, I have hereunto subscribed my name this 13th day of May, 1931.

WILLIAM SCHRODER.